May 8, 1962 F. E. CREVER 3,033,774
CONTROL SYSTEM FOR NEUTRONIC REACTORS
Filed Oct. 22, 1956 3 Sheets-Sheet 1

INVENTOR.
Frederick E. Crever
BY
Attorney

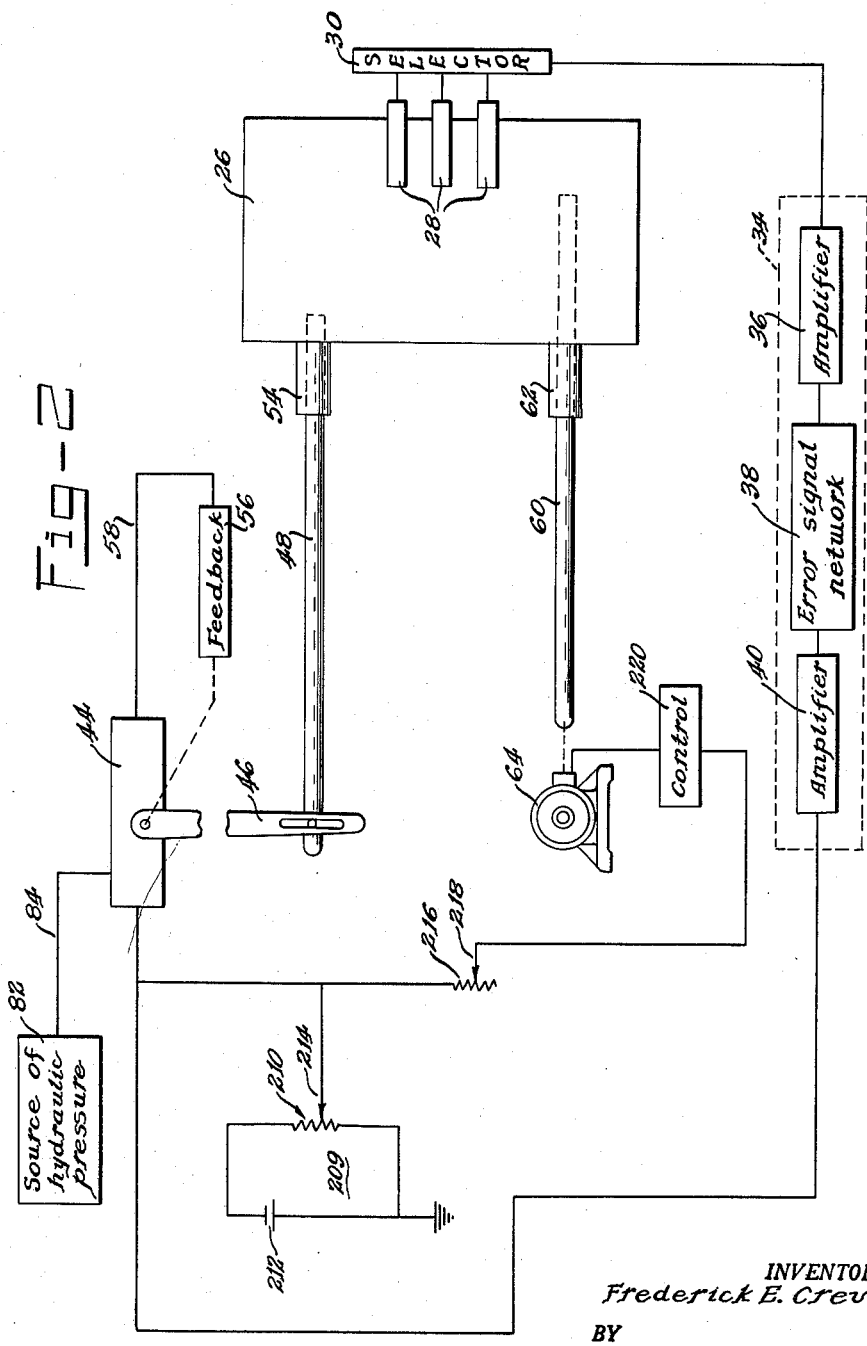

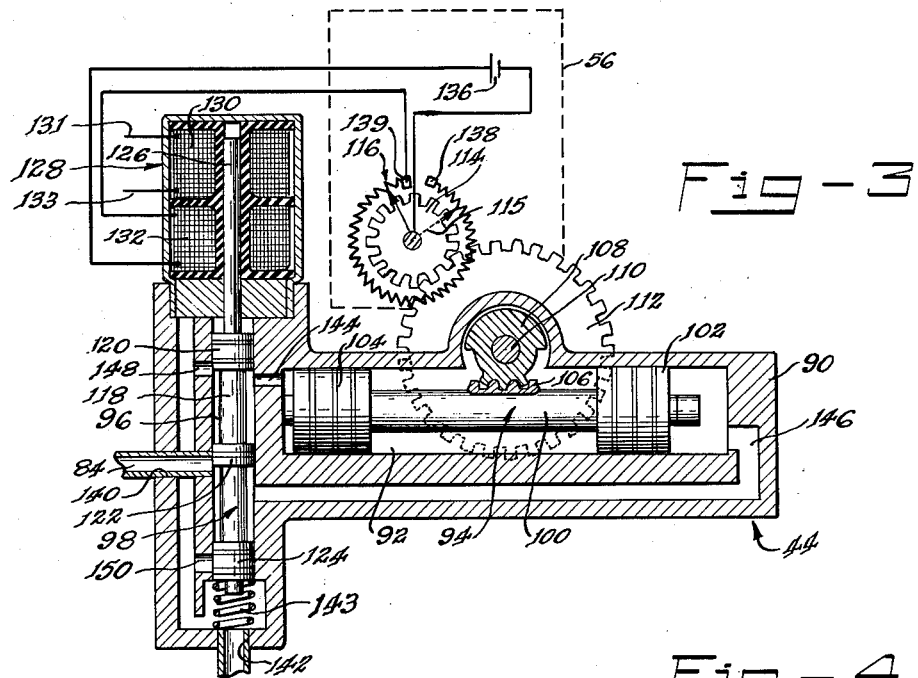

United States Patent Office 3,033,774
Patented May 8, 1962

3,033,774
CONTROL SYSTEM FOR NEUTRONIC REACTORS
Frederick E. Crever, Scotia, N.Y., assignor to the United States of America as represented by the United States Atomic Energy Commission
Filed Oct. 22, 1956, Ser. No. 617,672
1 Claim. (Cl. 204—193.2)

This invention relates in general to neutronic reactors and in particular to systems for regulating accurately and safely the neutronic reactivity in reactors.

A neutronic reactor comprises an assembly of materials in proper amounts and in distribution to achieve a release of neutrons from fuel material subjected to neutron fission. There are two types of neutrons released during the fission process, namely prompt and delayed neutrons. Of the total of neutrons released, over 99% comprise prompt neutrons which are released within a short period of time, approximately $10^{-14}$ seconds of the fission process. The prompt neutrons that are released during the fission process possess different energies which extend over a large range of approximately 1.0 ev. to 10 mev. Each neutronic reactor has its characteristics range of emitted neutrons commonly called the neutron energy spectrum. The neutron energy spectrum may be defined as the neutron energy distribution in the region of the reactor containing the fuel which sustains the neutronic chain reaction, said region generally called the core of the reactor. Neutronic reactors may be classified as fast, intermediate, and slow or thermal reactors depending upon the neutron spectrum within the reactor. If the neutron spectrum within the core of the reactor is predominantly of thermal energy, the reactor is termed a thermal or a slow reactor, while a neutron spectrum averaging to approximately 1000 ev. is present in a reactor having intermediate energies, and a neutron spectrum averaging greater than 1000 ev. is termed a fast reactor.

As is well known in the nuclear art, the thermal and the intermediate types of reactors can be controlled by insertion of control elements into the active portion of the reactors, said elements being constructed of materials capable of absorbing neutrons incident thereon. Since the use of too many control members complicates the design of the reactor structure, it is customary to compromise on the factors affecting optimum design and to use just a few members constructed of material having dispersed therein a high concentration of neutron-absorbing material. The use of a few members possessing strong neutron absorption capabilities has a disadvantage in that a comparatively large change in neutron flux has to occur before the rest of the control system associated with said control members will respond to bring the operation to its previous operating value. Therefore, such a control system lacks sensitivity and is incapable of maintaining accurately the output of a reactor at a preset operating level. Another disadvantage of using a control system employing a control member having a large effect on reactivity is that a too rapid movement of such a member could bring about a dangerous condition. If the flux is increased too rapidly, it is easy to create a condition in which the rate of rise of flux is so swift that the reaction would be impossible to control. This condition is referred to as prompt critical condition of the reactor, and is reached when the amount of excess reactivity, $\delta k$, exceeds 0.0075 in reactors utilizing uranium, found in natural state, for fuel. A malfunction (runaway) of the actuating mechanism controlling the rate of withdrawal of the control member out of the reactor would easily bring about this prompt critical condition.

One object of the invention is to provide a control system for controlling accurately and safely the operation of a neutronic reactor at a preset value.

Another object of the invention is to provide a control system using control members having different neutron absorption characteristics for regulating the power output of a neutronic reactor.

Another object of the invention is to provide a control system for controlling accurately the reactivity in a neutronic reactor by actuating neutron-absorbing members at different rates of speeds, said members cooperating with each other to bring about a composite control effect.

A further object of the invention is to provide a control system for controlling reactivity in a neutronic reactor, substantially without deviation from a preset operating level, with a control member having a fast response but limited effect on reactivity and another control member having a slow response but unlimited effect on reactivity, wherein the fast control member operates solely over a range corresponding to a small portion of its total range.

Other objects of the present invention will be apparent from the description which follows:

In accordance with the teachings of this invention, there is provided a control system for accurately maintaining reactivity within a reactor at a preset value with a minimum of deviation. The control system comprises a flux-responsive device, a first control member having a small amount of control over reactivity, a second control member having a large amount of control over reactivity, and means for translating the first member at a fast rate of speed and the second member at a slow rate of speed in an active portion of the reactor in response to deviation from a preset operating level. The first member is actually a rod actuated by a hydraulic piston the position of which is determined by the voltage on a coil of an incorporated solenoid-operated pilot valve. This voltage is proportional to the percentage deviation of the neutron flux level from a preselected level and is derived from an error signal amplifier. This amplifier receives a signal, corresponding to the flux level, from an ionization chamber positioned in the active portion of the reactor. To keep the fast moving rod centered in its normal or neutral operating range, a secondary or a follow-up rod is driven by a motor. The presentation of the first embodiment of the invention will describe a control system using a motor for driving the secondary rod wherein the motor is controlled by switches defining a neutral range of operation of the primary rod, and the presentation of the second embodiment will describe a control system utilizing a motor for operating the secondary rod wherein said motor is controlled by a voltage developed by an error signal amplifier.

The presently described control system has been constructed for automatically controlling an intermediate type reactor. In the design of the present system, the reactor kinetic characteristics were taken to be dependent upon delayed neutron emitter abundances and decay constants which are characteristic of the fissionable material and also were based upon the generation time for prompt neutrons estimated to be about $5 \times 10^{-6}$ seconds.

The automatic control system was designed to respond rapidly to small changes in reactivity so as to keep the operating level constant even with small sporadic reactivity variations or transients and to respond slowly to large changes in reactivity over a long period of time. The sporadic small changes in reactivity might be caused by variations in coolant flow, gas inclusions in the coolant, local gas bubble formation, and the like. The large slow changes in reactivity would be those due to temperature change, fission product poisoning, and fuel depletion.

If rapid changes in reactivity are made in a direction to increase the power output of a reactor, the amount of change must definitely be limited to less than the delayed neutron fraction or an unsafe condition will result. In order, therefore, to take care of the two types of reactivity variations equally in both directions, it was necessary to utilize a combination of a fast control member of limited amount of reactivity worth and a slow control member of great amount of reactivity worth, the worth of a control member being understood to mean its effect upon the reactivity within the reactor when said member is translated within the reactor. The worth of a control member can be made great or small by controlling the amount of a neutron-absorbing material, such as boron or cadmium, dispersed in a member constructed of a rigid material such as steel. The control members used in the control system described hereinbelow are of conventional design and utilize a dispersion of boron within the matrix of steel. The concentration of boron within the fast control member is such as to exert only a limited control over reactivity within the reactor, as will be elaborated upon later on. In this manner the fast control member can never inject prompt critical reactivity into the reactor. The fast control has been designed for a stable operation at all power levels by providing an error signal network for setting the power level of the reactor, which network automatically keeps constant the sensitivity of the control system under steady operating conditions. As a result of using the error signal network, the gain of the control system is constant under all steady operating conditions and the stability to small oscillations about any given power level is independent of the power level. As was indicated, the slow control is actuated by the position of the fast control when the latter is operating outside of its neutral range so that, whenever, a large correction has been made by the fast control, the slow control will slowly provide a sufficient change so that the fast control is returned to its previous reference position.

Both of the control system embodiments described herein are directed to the operation and control of neutronic reactors. It is to be understood that the control systems described herein may be equally used in other applications requiring two control members moving at different speeds to achieve a desired operation of machinery or other equipment.

The advantages of the apparatus of the present invention will be more fully understood from the following description including the drawings wherein:

FIG. 2 is a schematic diagram illustrating a second embodiment of the invention;

FIG. 3 is a cross sectional view of a hydraulic servo unit which is shown only as a block in FIGS. 1 and 2;

FIG. 4 is a diagram of an error signal network; and

FIG. 5 is a diagram of a modified form of the error signal network.

Figure 1:
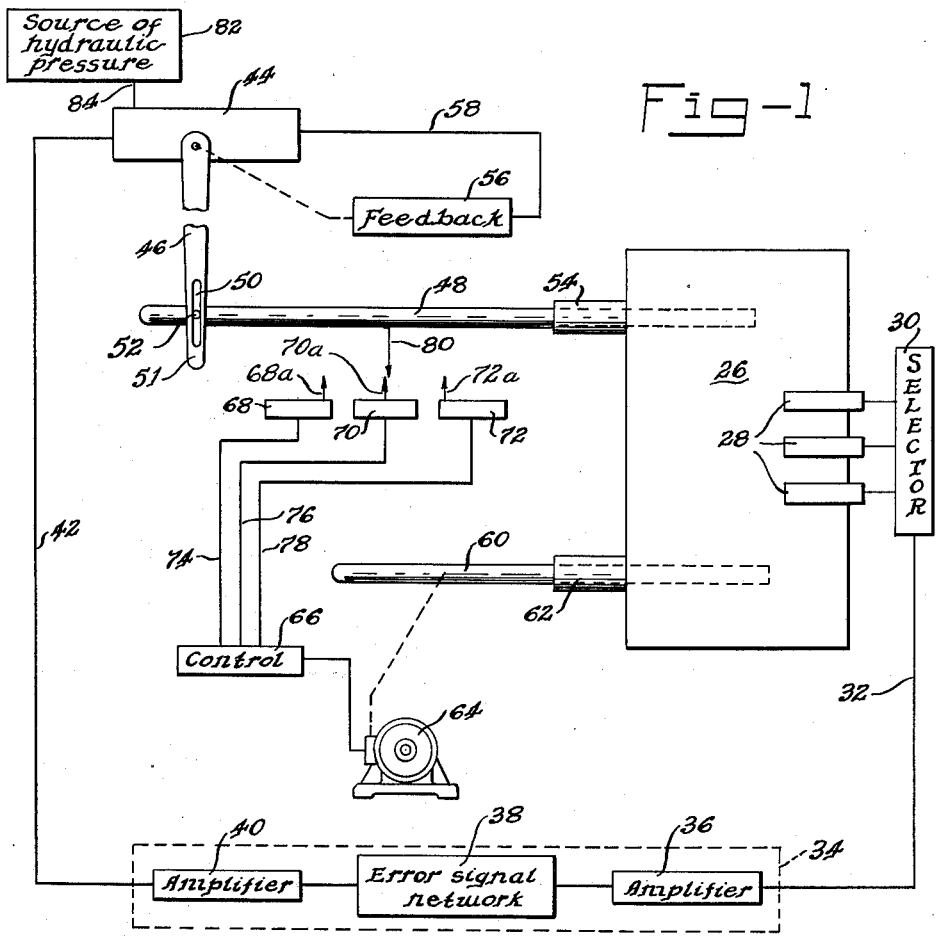
FIG. 1 is a schematic diagram illustrating a first embodiment of the invention.

The control systems described hereinafter are utilized for maintaining the operating level of reactors at a preset value, whether said reactors are of thermal or intermediate type. For example, the control systems may be utilized for controlling reactivity in the thermal type reactors disclosed in the U.S. Patent 2,708,656, issued to E. Fermi et al. on May 17, 1955, and in the intermediate type reactor described in an application, Serial No. 408,628, filed by Henry Hurwitz, Jr., et al. on February 5, 1954, now Patent No. 2,879,216, issued March 24, 1959. If additional information is required with respect to nuclear technology, reference should be made to "Science and Engineering of Nuclear Powers," C. Goodman, Addison-Wesley Press, Inc., Cambridge, Massachussetts, vol. I (1947), and vol. II (1949), and "Principles of Nuclear Reactor Engineering," S. Glasstone, D. Van Nostrand Co., Inc. (1955). As an aid to the understanding of the operation of servomechanism, reference may be had to "Network Analysis and Feedback Design," H. Bode, D. Van Nostrand Co., Inc., New York (1945), "Theory of Servomechanisms," H. M. James et al., McGraw-Hill Book Co. (1947), and "Servomechanisms and Regulating Design," H. Chestnut et al., vols. I and II, John Wiley and sons Inc., New York (1951).

The first embodiment of the invention comprises a control system for regulating the reactivity in a neutronic reactor 26, as shown in FIG. 1, having incorporated therein several radiation detectors, such as ionization chambers 28, for detecting the extent of neutron flux activity taking place within the reactor. The output of each of the ionization chambers 28 is connected to a selector 30 which is a conventional circuit adapted to select the ionization chambers 28 with the highest output and connect said output through a two-conductor line 32 to an error signal amplifier 34. The error signal amplifier 34 comprises an amplifier stage 36, an error signal network 38, and an amplifier stage 40. The amplifier stages 36 and 40 are conventional and will not be described in detail. The error signal network 38 will be described later with reference to FIGURES 4 and 5. The output of the error signal amplifier 34 is fed through a two-conductor line 42 to a servo unit 44 which is adapted to actuate, through an operating lever 46, a control member 48 having neutron-absorbing characteristics. The operating lever 46 has a longitudinal slot 50 disposed centrally thereof near its free end 51, said slot being adapted to engage a pin 52 attached near the free end of the control member 48. A support 54 is attached to the reactor 26 and slidably supports the control member 48 at its point of entry into the reactor 26. The servo unit 44 functions to translate the control member 48 within the reactor 26 at a rapid rate of speed, said control member 48 being designated as a primary control or a fast control. A feedback means 56 is mechanically coupled at the operating lever 46 and functions to transmit a signal back into the hydraulic servo unit 44 over the line 58 to modify its operation. The structure of the servo unit 44 and the feedback means 56 will be described later with reference to FIG. 3.

The reactor 26 has also a control member 60 adapted to cooperate with the first control member 48 in regulating neutron reactivity therein. The control member 60 is slidably supported in the same manner as the primary control member by utilizing a support 62 mounted at the point of entry into the reactor 26. The control member 60 is actuated at a slow rate of speed and is designated as a secondary control or slow control. The control member 60 is actuated by a motor 64 which is controlled by control means 66, which in turn is affected by switches 68, 70 and 72 and their levers 68a, 70a and 72a, respectively, connected thereto by lines 74, 76 and 78, respectively. As is indicated, the switches 68, 70 and 72 are distributed linearly along the path of travel of the primary control member 48. A trip lever 80 is mounted approximately in midposition of the primary control member 48 so that it will contact levers of any one of the switches 68, 70 and 72 during the translation of said member. The motive power of the servo unit 44 is supplied by a fluid transmitted thereto from a source of hydraulic pressure 82 via the line 84. The operation of the control system for regulating the nuclear reactivity in the reactor 26 will be described later after the brief description of the hydraulic servo unit 44 which follows:

A cross sectional view of the servo unit 44 is shown in FIG. 3 wherein a housing 90 has a large cylindrical chamber 92 containing a movable element 94 and a small cylindrical chamber 96 having therein a movable element 98. The movable element 94 comprises a shaft 100 having piston heads 102 and 104, one at each end of the shaft. The shaft 100 carries a rack 106 engaging a gear 108 secured to a shaft 110 which extends through the housing 90 and supports in secured relation a spur gear 112 engaging another spur gear 114 which is adapted to actuate a wiper 115 of a rheostat 116. The movable element 98 is a pilot valve comprising a shaft 118 having valve heads 120, 122 and 124, the valve heads 120 and 124 being disposed on the shaft 118 so that they occupy positions near the ends of the chamber 96, the valve head 122 being located midway between the valve head 120 and 124. The shaft 118 extends beyond the valve head 120 and terminates in an extension 126 which serves as a plunger operating within a solenoid 128. The solenoid 128 has a control coil 130 and a stabilizing coil 132. The leads 131 and 133 of the control coil 130 are connectable through the two-conductor line 42 to the error signal amplifier 34 (FIG. 1). One lead of the stabilizing coil 132 is connected to the rheostat terminal 139 on the rheostat 116 while the other lead is connected to one terminal of a current source 136. The other terminal of the current source 136 is connected to the wiper 115 of the rheostat 116.

The housing 90 has an inlet port 140 connected by line 84 to the source of hydraulic pressure 82 and has an outlet port 142 connected to a drain. A tension spring 143 is secured to the movable element 98 at its valve head 124 and the housing 90 directly around the port 142. When the coils 130 and 132 are not energized, the tension of the spring 143 exerts a pull on the movable element 98 within the small chamber 96 so that the central valve head 122 is below the port 140 thereby enabling said port to communicate with the portion of the small chamber 96 between the valve heads 120 and 122. The large chamber 92 has ports 144 and 146 for providing ingress and egress of pressure fluid to regions of the chamber 92 between its ends and the piston heads 102 and 104, while the small chamber 96 has ports 148 and 150 providing escape of hydraulic fluid from the small chamber 96 to the outlet port 142. The inlet port 140 is located in the midportion of the small chamber 96.

The error signal network 38, shown in detail in FIG. 4, has a potentiometer 158 comprising a resistor 160 terminated across a pair of input terminals 162 and 164 and a wiper 165 connected through a source of voltage 166 to an output terminal 168. The error signal network 38 has a pair of output terminals 168 and 172, the input terminal 164 being common to the output terminal 172. The importance of the error signal network 38 in the control system will be discussed later.

A modification of the error signal network 38 is shown in FIG. 5, said modification having a greater flexibility of control. This circuit has a pair of input terminals 180 and 182 connected across a series pair of potentiometers 184 and 186 having contact wipers 188 and 190 connected to a pair of voltage sources 192 and 194, respectively. It is to be noted that the wiper 188 is connected to a negative terminal of the voltage source 192, and the wiper 190 is connected to a positive terminal of the voltage source 194. The other terminals of the voltage sources 192 and 194 are connected with one another across a parallel combination of potentiometers 196 and 198 having contact wipers 200 and 202 terminating in a pair of output terminals 204 and 206, respectively.

The operation of the first embodiment of the control system will now be described with reference to FIGS. 1 and 3. During normal operation, i.e., when the reactor 26 is operating at a level at which it has been preset, the selector 30 will connect one of the detectors 28 to the error signal amplifier 34 so that the ionization current of said connected detector will be connected to the input of the amplifier stage 36. The voltage output of the amplifier 36 is then impressed across an error signal network 38, for example, across the terminals 162 and 164 shown in FIG. 4. A portion of the signal voltage $V_n$ impressed across the potentiometer 158 is compared in the error signal network 38 against a fixed voltage standard E comprising the battery 166. Inasmuch as the reactor 26 is operating at the preset value, the voltage developed across a portion of the resistance 160 is balanced out by the voltage of the voltage standard 166 with the result that there is no voltage output at the output terminals 168 and 172, i.e., he voltage $V_e$ is zero. The net result is that the amplifier stage 40 having a zero input will therefore have zero output with no current being transmitted through the two-conductor line 42 to the control coil 130.

The arrangement of the error signal amplifier 34 is such that, when a predetermined portion of the voltage $V_n$ is less than the voltage E of the standard source 166, the output at terminals 168 and 172 is impressed across the amplifier 40 and causes it to transmit a current through the two-conductor line 42 to the control coil 130, which current creates therein an electromagnetic force that is added to the electromagnetic force developed by the current in the stabilizing coil 132. Said predetermined portion of voltage $V_n$ is less than the voltage standard E when the actual neutron flux in the reactor is lower than at which the reactor is set to operate.

Conversely, when said predetermined portion of voltage $V_n$ is greater than the voltage standard E, the output at terminals 168 and 172 is reversed and causes the amplifier 40 to transmit to the control coil 130 a current that creates therein an electromagnetic force that is subtracted from the electromagnetic force developed by the stabilizing coil 132. Said predetermined portion of voltage $V_n$ is greater than the voltage standard E when the actual flux in the reactor is greater than that at which the reactor is set to operate.

When the reactor is operating at the flux level for which it is set, no current flows through the control coil 130, and the stabilizing coil 132 alone governs the position of the movable element 98. When the rheostat wiper 115 occupies a midposition between the terminals 138 and 139, the current in the stabilizing coil 132 exerts a sufficient force on the plunger 126 against the spring 143 to maintain the movable element 98 in a neutral position in which the valve heads 120, 122, and 124 block the ports 148, 140, and 150. The result is that pressure fluid neither enters nor escapes from the chamber 92 and the movable element 94 and the control member 48, geared thereto, are locked against movement. The rheostat wiper 115 is in the aforementioned midposition when the movable element 94, to which the wiper 115 is geared, is in a midposition in the chamber 92.

In the aforementioned intermediate position of the rheostat wiper 115, due to an intermediate position of the movable element 94, the current in the stabilizing coil 132 will have a certain intermediate value. As the element 94 moves from its intermediate position to the left end of the chamber 92 as viewed in FIG. 3, the wiper 115 moves toward the terminal 138, with the result that the current in the stabilizing coil 132 becomes less than the aforementioned intermediate value. As the element 94 moves from its intermediate position to the right end of the chamber 92 as viewed in FIG. 3, the wiper 115 moves toward the terminal 139, with the result that the current in the stabilizing coil 132 becomes greater than the aforementioned intermediate value. In this position, pressure fluid from the port 140 enters one end of the chamber 92 through the port 146, and fluid escapes from the other end of the chamber through the ports 144 and 148, with the result that the movable element 94 moves leftward as viewed in FIG. 3 to the position of FIG. 3, for example. The control member 48, being geared to the element 94, moves out of the reactor 26 so as to increase its reactivity. The speed at which the control member 48 and the element 94 move are dependent upon the extent to which the ports 148 and 140 are uncovered by the valve heads 120 and 122 and such uncovering is, in turn, dependent on the magnitude of the current flowing in the control coil 130, which magnitude is in turn dependent upon the percentage departure of the actual neutron flux from the amount of flux at which the reactor is set to operate.

The movement of the element 94 to the left has, as previously explained, the effect of decreasing the current in the stabilizing coil 132, so that the total electromagnetic force exerted by the coils 130 and 132 on the plunger 126 is reduced, and the spring 143 takes over to return the element 98 to the neutral position in which the ports 140, 148, and 150 are blocked. The result is that the element 94 is locked in the chamber 92 at some new position to the left of the midposition. The amount of displacement of the new position from the midposition is dependent on the amount the ports 148 and 140 were uncovered by the valve heads 120 and 122, which amount was dependent on the current in the control coil 130, which current is dependent on the percentage of departure of the actual neutron flux from the predetermined flux. Since the element 94 determines the position of the control member 48, the latter becomes locked in a position dependent upon the percentage departure of the actual flux from the flux at which the reactor is set to operate.

With the control member 48 in its new position, it is presumed that the actual reactivity will rise. With such rise the percentage difference between actual flux and predetermined flux becomes less, with the result that the current in coil 130 and the electromagnetic force exerted thereby become less and the spring 143 pulls the element 98 downward as viewed in FIG. 3 from its neutral position in which the ports 148, 140, and 150 are blocked to a new position in which the port 148 remains blocked and the ports 140 and 150 become unblocked. Consequently, pressure fluid from the port 140 enters one end of the chamber 92 through the ports 146 and 150. As a result, the element 92 is moved rightward as viewed in FIG. 3, causing the control member 48 to move with respect to the reactor 26 in a direction calculated to decrease reactivity. Rightward movement of the element 92 also shifts the rheostat wiper 115 toward the terminal 139, increases the current in the stabilizing coil 132 and the electromagnetic force exerted thereby, and returns the element 98 to the neutral position in which ports 148, 140, and 150 are blocked. The result is that the element 94 and the control member 48 are locked in new positions.

If the actual neutron flux rises above the predetermined flux, the current in the control coil 130 and the electromagnetic force exerted thereby are reversed, so that the net electromagnetic force exerted by both coils 130 and 132 is considerably reduced. The result is that the element 98 moves down a significant amount, uncovering the ports 140 and 150 sufficiently to cause the element 94 to move a fair distance to the right. This movement of the element 94 will move the rheostat wiper 115 a fair distance toward the terminal 139 so that the current in the stabilizing coil 132 and the electromagnetic force exerted thereby will rise sufficiently to overcome the spring 143 and return the element 98 to neutral position in which the ports 148, 140, and 150 are blocked, in spite of the fact that the electromagnetic force exerted by the control coil 130 acts against that exerted by the stabilizing coil 132.

It should be understood that, when the electromagnetic force in the control coil 130 is reversed and acts in opposition to that in the stabilizing coil 132, the electromagnetic force in the control coil 130 is less than that in the stabilizing coil 132.

So far, a description of the operation of the control system has been made with reference to small changes occurring in the neutron flux within the reactor 26, wherein, only the primary control member 48 was called upon to make an adjustment in the flux output of the reactor 26. During these small changes of reactivity, the primary control member 48 operated in a neutral operating range, i.e., the range subtended by the two levers 68a and 72a of the switches 68 and 72, respectively, wherein the positions of said switches are adjustable so that the neutral range may be varied as desired. During the operation of the primary control member 48 in its neutral range, the trip lever 80 remains between the levers 68a and 72a without actuating the switches associated with said levers. If the decrease in reactivity continues, a large change will eventually occur and cause the servo unit 44 to pull the primary control element 48 outside of its neutral operating range causing the trip lever 80 to close momentarily the switch 68 to energize the control means 66 with the result that the motor 64 will be operated and move the secondary control member 60 out of the reactor 26 thereby increasing reactivity in the reactor 26 and, therefore, assisting the primary control member 48 in controlling the reactivity. The movement of the secondary control member 60 is adjusted so that it is slow when compared with the movement of the primary control member 48. The motor 64 will continue to run and pull the member 60 out of the reactor 26 to increase the reactivity above the original preset level until it is de-actuated by the primary control member 48 in a manner to be described.

At the time the slow control member 60 was actuated, the fast control member 48 was outside of its neutral operating range having the trip lever 80 to the left of the lever 68a of the switch 68 as may be realized in FIG. 1. As the slow control member 60 is withdrawn out of the reactor 26, the neutron flux continues to increase until the increase is slightly beyond the magnitude preset for the particular operating point. As the increase in flux passes this reference point, the subsequent increase in the output of one of the ionization chambers 28 causes the error signal amplifier 34 to change the input into the servo unit 44 so that it is actuated to insert the fast control member 48 back into the reactor 26 to overcome this slight increase in flux. As the primary control member 48 moves further into the reactor, the trip lever 80 will be moved from its previous position adjacent the switch 68 past the position occupied by the switch 70. The trip lever 80 will then actuate the lever 70a on the switch 70 and de-energize the control means 66 to shut down the motor 64 and the associated slow control member 60. The slow control member 60 does not assist the fast control member 48 until the latter moves out of its neutral operating range, i.e., the trip lever 80 on the control member 48 is moved to the extreme or right position so as to engage either lever 68a or 72a on the switches 68 or 72. Otherwise, the fast control member 48 will perform saitsfactorily by itself to keep the proper control over the reactivity within the reactor 26. On the other hand, if the change in reactivity is in the positive sense, i.e., an increase in reactivity, and the increase in reactivity is large, the fast control member 48 and the slow control member 60 will cooperate to decrease the neutron flux and maintain the reactivity in the reactor 26 at the preset level in a manner similar to that described above.

The second embodiment of the control system designed for regulating neutron flux in a neutronic reactor is shown in FIG. 2. Most of the elements described in the first embodiment are contained in the second embodiment and are therefore designated by the same reference numerals. The control means 66 in the first embodiment was controlled by switches 68, 70 and 72, whereas control means 220 in the second embodiment is controlled by a signal from an error signal amplifier 34 as will be presently described. The magnitude of the neutron flux in the reactor 26 is detected by the ionization chambers 28, the highest output of one of these ionization chambers being selected by the selector 30 and applied to the error signal amplifier 34. The deviation of the ionization signal from a preset operating level signal is amplified and detected by the error signal amplifier 34 and transmitted to the servo unit 44 to actuate an operating lever 46 to translate the primary control member 48 in the reactor in such a direction as to bring the operating level of the reactor 26 back to its preset value. So far, the components and the mode of operation are the same as was described with respect to the first embodiment. The second embodiment of the invention differs from the first embodiment in that a portion of the output of the error signal amplifier 34 is compared with a voltage standard across a network 209 comprising a potentiometer 210 connected across a voltage source 212, said potentiometer having a wiper 214 connected to the amplifier output and to an adjustable resistor 216 which has a sliding contact 218 connected to the control means 220. The sensitivity of the control means 220 is adjusted by the resistor 216. The control means 220 is conventional and may be operated as either a proportional regulating system or a discontinuous regulating system.

In the proportional regulating system, the control 220 applies continuously an actuating voltage to the motor 64, the actuating voltage being proportional to and in phase opposition to the output of the error signal amplifier 34. If the output of the error signal amplifier 34 is small, the motor 64 has applied to it a low voltage which is insufficient to operate the motor, and if the output of said error signal amplifier is increased, the corresponding increase in the voltage applied to the motor 64 will cause it to respond. In this type of system, the sensitivity of the control means 220 may be adjusted so that the slow control member 60 will respond only after a predetermined displacement of the fast control member 48 has occurred, whether large or small, depending on the operating condition desired.

In the discontinuous regulating system, the control means 220 remains inoperative provided the signal output of the error signal amplifier 34, as made available at the adjustable resistor 216, remains within a certain range. If the voltage at the wiper 218 strays outside of the defined range, the control means 220 will become actuated thereby and will in turn energize the motor 64 to translate the slow control member 60 at a preset velocity in a direction to assist the fast control member 48 and, therefore, enable it to return to its normal operating (neutral) range. In this type of regulating system, the control means 220 can also be adjusted so that it responds only after a predetermined movement of the fast control member 48 has occurred, whether small or large, as determined by the operating condition desired.

The hydraulic servo unit 44 and its associated solenoid-operated pilot valve 98, as used in all of the described embodiments of invention, is a unit that has been well known to industry for several years. Its use has become common in many control applications where reliability and long life are of importance. The hydraulic servo unit 44 depends upon the displacement of the spring loaded pilot valve 98 to port oil to and from its source of fluid pressure 82. The servo unit is inherently a velocity device, i.e., the piston velocity is proportional to pilot valve displacement. However, the addition of the feedback circuit 56, in which the setting of the rheostat 116 depends upon piston position, changes the servo unit 44 into one in which the piston position is proportional to signal. The hydraulic servo unit is suited for this application because of its high force to inertia ratio which enables it to drive the control member with the desired frequency response.

As was indicated previously, the concentration of the neutron-absorbing material within the fast control member determines the worth or the effectiveness of the control member in varying the multiplication factor, $\delta k$, of the reactor. The effectiveness or worth of the control member is such so that the instantaneous removal of said control member out of the reactor will not increase the reactivity to precipitate a prompt critical condition. A prompt critical condition is reached when the amount of excess reactivity exceeds one dollar. The value of one dollar in a natural uranium fueled reactor is approximately equal to 0.0075. The excess reactivity less than one dollar is usually expressed in cents worth. In the present design, the fast control member 48 has a worth of 46 cents or 0.46 of the delayed neutron fraction which is 0.0075. This range is divided so that the maximum period in the increased reactivity direction will be about 50 seconds and in the negative or decreased reactivity direction will be about 100 seconds, i.e., the center of the neutral operating range of the fast control member 48 within the reactor is such that about 16% of the member is always in and is maintained thereat, within a few percent of the active length of said member, by the means associated with the secondary control member 60. This 16% control of the maximum range of the control member 48 is the zero of the neutral operating range wherein the trip lever 80, as shown in FIG. 1, is superimposed over the lever 70a of the switch 70. Over its entire range of operation, the fast control member 48 can make corrections for negative reactivity variations of 0.16 of the delayed neutron fraction and for positive variations of reactivity of 0.30 of the delayed neutron fraction. The same principles are applicable to any fast or intermediate reactor with plutonium or $U^{233}$ or $U^{235}$ as fissionable fuel. In the present control system, a gain of 26 db is attained at $f_1=0.26$ cycle per second and a gain of unity is realized at the operating frequency, $f_c$ which is 5 cycles per second. The other extreme of the operating range, $f_2$, is about 20 cycles per second. In designing the control system, the reactor kinetic characteristics were taken to be dependent upon the delayed neutron emitter abundances and decay constants of the fissionable material $U^{235}$ and also are based upon the generation time for prompt neutrons estimated to be about $5 \times 10^{-6}$ seconds. The response time of the hydraulic servo unit 44 was found to be 0.0325 second and the system as a whole has been constructed to have stable characteristics by having a phase shift around the feedback loop of less than 135°.

Ordinarily, the output of a neutron detector would be connected through an amplifier to a servo unit to provide a simple control loop, the function of the amplifier being to impress a proper voltage across a control coil in the servo unit. In this type of arrangement, the error voltage applied to the control coil is directly proportional to the level of the neutron flux, $n_0$, which does not vary linearly over a wide range, as is evident from the relation $$n = n_0 e^{\frac{t(k-1)}{l}}$$

where $n_0$ is the initial number of neutrons,
$n$ is the number of neutrons after the lapse of time $t$,
$k$ is the multiplication factor, the number of neutrons present at the end of a neutron generation for each neutron present at the beginning of that generation, and
$l$ is the average time between successive neutron generations.

A control loop of this type will operate satisfactorily at a single power level only, i.e., $n_0$ being constant, wherein the control parameter is merely a suitable function of $n$ which is the difference between the demand power and the actual value.

The purpose of the error signal network 38 is twofold: first, it provides an error signal which represents the difference between the output of one of the selected detectors 28 and the preset operating level (power demand signal) of the reactor 26; and second, it provides a means for eliminating the dependence of the system gain upon neutron level imposed by the reactor, inasmuch as a reactor gain is proportional to the level at which the reactor is operating. The "gain" of the reactor being defined as $$\frac{\Delta n}{D}$$

wherein $\Delta n$ is a small variation in neutron density and $D$ is excess reactivity expressed in the form $$\frac{\Delta k}{B}$$

$\Delta k$ being a small variation or reactivity corresponding to $\Delta n$ and B being the delayed neutron fraction. This dependency is removed by making the error signal proportional to the percentage deviation of the level from a preset level by means of the error signal network 38.

The signal available at the output terminals 168 and 172 is of the form error/level. The term $V_n$ is the signal of one of the detectors 28 impressed across the input terminals 162 and 164. The term $V_e$ is the output error signal impressed across the amplifier 40, and the reference voltage (power demand) $V_0$ can be defined as $$V_0 = \frac{E}{K_2}$$

This results in the following relation:

$$V_e = K_2 V_n - E$$
$$= \frac{E}{V_0} V_n - E$$
$$= E\left(\frac{V_n}{V_0} - 1\right)$$

Dropping the designation for the voltages $V_n$ and $V_0$ $$V_e = E\left(\frac{n}{n_0} - 1\right)$$
$$= E\left(\frac{n - n_0}{n_0}\right)$$

The deviation in the neutron flux (error) is $\delta n = n - n_0$ therefore $$V_e = E \frac{\delta n}{n_0}$$

The last expression shows that the error signal $V_e$ is inversely proportional to the level $n_0$ of the reactor. As a result, the reactor may be operated at different power ranges without affecting the gain of the control system.

While there have been described what is at present considered the preferred embodiments of the invention, it will be understood that various modifications may be made therein and it is intended in the appended claim to cover all such modifications as found within the true spirit and scope of the invention.

What is claimed is:

In a neutronic reactor system, a control apparatus comprising, in combination, two control members adapted to be moved to vary the neutron flux of a reactor, the reactivity worth of the first control member being less than one dollar and that of the second control member being greater than the excess reactivity of the reactor, means for generating an error signal proportional to the percentage deviation of the neutron flux level from a preset flux level, motive means responsive to said error signal to actuate said first control member in a direction to maintain constant power, said first control member being adapted to normally operate over a small range centered about a disposed position corresponding to 16 cent reactivity, and motive means responsive to the operation of said first control member outside of its small portion of its total range to actuate the second control member in the same direction to effect the return of the first control member to its limited operating range, wherein the movement of the second control member is at a rate slow compared to the rate of actuation of said first member.

References Cited in the file of this patent
UNITED STATES PATENTS 2,781,308   Creutz et al.  _____ Feb. 12, 1957
2,843,543   Christy  _____ July 15, 1958

OTHER REFERENCES

AECD-4209, U.S.A.E.C. document by Owens, Crever and Pigott, dated March 29, 1949, declassified Dec. 9, 1955. (Copy in 204/154.3.)

Schultz: Control of Nuclear Reactors and Power Plants, McGraw-Hill Book Co., N.Y. (1955); pages 62, 70, 253–255.

The Reactor Handbook (AECD-3646), vol. 2, U.S. AEC May 1955; pages 927, 935–6, 937–942.